United States Patent Office 3,546,169
Patented Dec. 8, 1970

3,546,169
CURABLE COMPOSITIONS BASED ON OXIRANE POLYEPOXIDES AND LIQUID EUTECTIC MIXTURES OF o-TOLYLENEDIAMINE, m-TOLYLENEDIAMINE, AND BIS(AMINOPHENYL)METHANE
Louis F. Cole, Piscataway, N.J., assignor to Union Carbide Corporation, a corporation of New York
No Drawing. Filed Apr. 4, 1967, Ser. No. 628,263
Int. Cl. C08g 30/14
U.S. Cl. 260—47
8 Claims

ABSTRACT OF THE DISCLOSURE

This invention relates to curable compositions, based on oxirane polyepoxides and liquid eutectic mixtures of o-tolylenediamine, m-tolylenediamine, and bis(aminophenyl)methane, whiche are characterized by excellent storage life and which when used in the desired manner, as for example, in casting applications to form articles of desired shape, are characterized by improved properties.

---

This invention relates to liquid eutectics comprising a mixture of o-tolylenediamine, m-tolylenediamine and bis(aminophenyl) methane which are particularly desirable for use as latent hardeners for polyepoxides. More particularly, this invention relates to polyepoxide compositions, containing the liquid eutectic mixtures, as described, which can be easily compounded with other materials to provide compositions of desired formulation having excellent storage life and from which infusible products can be obtained having excellent physical, chemical and electrical properties.

Polyepoxide compositions, such as those based on polyglycidyl ethers of polyhydric phenols, having an epoxy equivalency of greater than one, generally contain an aromatic polyfunctional amine as the curing agent as the resultant compositions will cure to infusible products which are characterized by excellent physical, chemical and electrical properties. The polyglycidyl ethers are usually admixed with a measured amount of an aromatic polyfunctional amine ranging from about 90 percent of stoichiometric to about 15 percent in excess of stoichiometric and the compositions utilized as desired, for example, in casting applications. Because of the high reactivity of these polyfunctional amines toward the polyglycidyl ethers, however, the curing reaction commences immediately upon admixing of the two materials. Consequently, polyglyicidyl ethers containing these polyfunctional amines "fast cure" that is, these compositions cure to infusible products in a relatively short period of time.

The problem of "fast cure" has presented many obvious difficulties since it is not always possible to use these polyglycidyl ether compositions immediately upon formulation. In most instances, these polyglycidyl ether compositions cure before they can be used in the desired manner.

Various suggestions have been made for purposes of improving the relatively poor storage life of curable polyglycidyl ether compositions. For example, it has been suggested to add to the polyglycidyl ether compositions a compound which is unreactive per se, but one which under the impetus of heat will become activated and react with the polyglycidyl ethers with the result that the compositions will cure to infusible products. Latent acting compounds, particularly of the type described, have proved to be undesirable because of the uncertainty and unpredictability of the "activation reaction." As an illustration, a small variation in the amount of heat imparted to the compositions during the "activation" cycle can seriously affect the extent to which the activation reaction proceeds and, consequently, the amount of "activated compound" formed.

The present invention provides liquid eutectic mixtures of o-tolylenediamine, m-tolylenediamine and bis(aminophenyl) methane which when added to polyepoxides result in the formulation of compositions which have excellent storage life, but once used in the desired manner, for instance in casting applications, will cure to infusible products characterized by improved properties.

The liquid eutectics of this invention remain stable, at room temperature, about 23° C., over prolonged periods of time, and being liquids can be admixed with polyepoxides to form homogeneous mixtures without first being subjected to additional processing steps. For example, when it is desired to blend a solid hardener with a solid polyepoxide, it is customary to first heat the hardener to a fluid state and then admix the fluid hardener with the solid polyepoxide.

The liquid eutectics of this invention, as stated, comprise a mixture of o-tolylenediamine, m-tolylenediamine and bis(aminophenyl) methane. Generally, the liquid eutectics of this invention are made up of the named components in the following amounts wherein parts by weight are based on each 100 parts by weight of the mixtures $(a)+(b)$:

Component $(a)$—about 35 to about 45 parts by weight of a mixture of o-tolylenediamine and m-tolylenediamine wherein the o-tolylenediamine is present in an amount of about 60 to about 70 percent by weight and the m-tolylenediamine is present in an amount of about 30 to about 40 percent by weight, based on the combined weight of the o-tolylenediamine and m-tolylenediamine and Component $(b)$—about 55 to about 65 parts by weight of bis(aminophenyl) methane.

The term m-tolylenediamine as used herein encompasses 2,4-diaminotoluene, 2,6-diaminotoluene and mixtures thereof.

The term o-tolylenediamine as used herein encompasses 2,3-diaminotoluene, 3,4-diaminotoluene and mixtures thereof.

The term bis(aminophenyl) methane as used herein encompasses bis(p-aminophenyl) methane, bis(o-aminophenyl) methane, bis(m-aminophenyl) methane, mixed isomers thereof such as 2,4'-diaminodiphenyl methane as well as mixtures of these compounds.

The polyepoxides suitable for purposes of this invention are those organic compounds having an oxirane epoxy equivalency of greater than one, that is, compounds having an average of more than one oxirane epoxy group, i.e.,

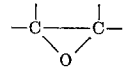

per molecule. These compounds, wherein the oxygen of the epoxy group is attached to vicinal carbon atoms, can be saturated or unsaturated, aliphatic, cycloaliphatic, or heterocyclic, and can be substituted with substituents such as halogen atoms, alkyl groups, ether groups and the like.

Illustrative of suitable polyepoxides are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al., U.S. Patent 2,506,486 and polyphenylols such as the novolak condensates of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, and heptaphenylols described in U.S. Patent 2,885,385 to A. G. Farnham. The phenols may contain substituents such as alkyl or aryl ring substituents or halogens, as exemplified by the alkyl resorcinols, tribromoresorcinol, and the bisphenols containing alkyl and halogen substituents on the aromatic ring (Bender et al., U.S. Patent 2,506,486). The polyhydric polynuclear phenols can consist of two or more phenols connected by such groups as methylene, alkylene or sulfone. The connecting groups are further exemplified by bis(p-hydroxyphenyl)-methane, 2,2-bis(p-hydroxyphenyl)propane, and dihydroxydiphenyl-sulfone.

Process for the preparation of polyglycidyl ethers of polyhydric phenols is described in detail in the Bender et al. patent (supra) and U.S. Patent 2,943,095 to A. G. Farnham et al.

Particularly desirable for purposes of this invention are the polyglycidyl ethers of the bis(hydroxyphenyl)-alkanes, for example, the diglycidyl ether of 2,2-bis(p-hydroxyphenyl)-propane, and the diglycidyl ether of bis-(p-hydroxyphenyl)methane. Other suitable polyglycidyl ethers of polyhydric phenols are enumerated in U.S. Patent 2,633,458 to E. C. Shokal.

Also suitable are the polyglycidyl ethers of polyhydric alcohols, such as the reaction products of epichlorohydrin and aliphatic compounds containing from two to four alcoholic hydroxyl groups, such as ethylene glycol, propane diols, butane diols, glycerine, hexane triols and the like. (Methods of preparing polyglycidyl ethers of polyhydric alcohols are described in U.S. Patent 2,898,349 to P. Zuppinger et al.)

Other suitable polyglycidyl compounds are the polyglycidyl esters of polycarboxylic acids, such as the polyglycidyl esters of adipic acid, phthalic acid and the like. Polyglycidyl esters of polycarboxylic acids are described in detail in U.S. Patent 2,870,170 to Payne et al. Also suitable are polyglycidyl compounds produced by reacting epichlorohydrin with aromatic amines, such as aniline, 2,6-dimethylaniline, p-toluidine, m-chloroaniline, p-aminodiphenyl, m-phenylene diamine, p-phenylene diamine, 4,4'-diaminodiphenyl methane, or with amino phenols such as p-amino phenol, 5-amino-1-n-naphthol, 4-amino resorcinol, 2-methyl-4-amino phenol, 2-chloro-4-amino phenol and the like. Specific compounds include among others, N,N-diglycidyl aniline, N,N-diglycidyl-2,6-dimethyl aniline, N,N,N',N'-tetraglycidyl-4,4'-diamino diphenyl methane, the triglycidyl derivative of p-amino phenol wherein the aminohydrogen and OH hydrogen atoms are replaced by glycidyl groups.

Polyglycidyl derivatives of aromatic amines and amino phenols and methods for their preparation are further described in U.S. Patents, 2,951,825 and 2,951,822 to N. H. Reinking and N. H. Reinking et al., respectively.

The so-called peracetic acid epoxies which are obtained by epoxidation across a double bond, such as bis-(2,3-epoxycyclopentyl)ether, 3,4 - epoxy-6-methylcyclohexylmethyl-3,4-epoxy-6-methylcyclohexane carboxylate, vinylcyclohexene dioxide, dicyclopentadienedioxide and the like are also suitable.

The amount of the liquid eutectic mixtures of this invention used with the polyepoxides is sufficient to cure the polyepoxides to infusible products. As a rule, amounts generally used range from about 70 percent of stoichiometric to about 20 percent in excess of stoichiometric. Optimum properties in cured polyepoxide compositions are achieved using about a stoichiometric amount of the liquid eutectic mixtures. For purposes of stoichiometric calculations, one epoxy group:

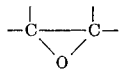

is deemed to react with one amino hydrogen atom.

The polyepoxide compositions of this invention are cured by being heated at elevated temperatures, generally on the order of about 75° C. to about 150° C. for about 2 to 6 hours. The exact curing cycle will vary and depend upon the formulation of the composition.

Additional materials such as fillers, pigments, fibers, dyes and the like can be added to the liquid eutectics and/or the polyepoxide compositions of this invention, if so desired.

In the following examples, which are illustrative, Eutectic Mixture I was formulated by melting all of the components, adding the bis(p-aminophenyl) methane component to a still and adjusting the temperature of the bis(p-aminophenyl) methane to 90° C. and adding thereto a sufficient amount of a mixture of 2,4-diaminotoluene and 2,3-diaminotoluene (the mixture contained 60% by weight 2,3-diaminotoluene and 40% by weight 2,4-diaminotoluene) to provide a liquid eutectic containing 60 parts by weight bis(p-aminophenyl)methane and 40 parts by weight of the tolylendiamines.

Eutectic Control 1 was formulated by admixing m-phenylenediamine and bis(p-aminophenyl)methane to provide a liquid eutectic containing 60 percent by weight bis(p-aminophenyl) methane and 40 percent by weight m-phenylenediamine.

Various compositions, formulations for which are noted below, were prepared and tested. The results of these tests are noted below.

Control A—100 parts by weight of diglycidylether of 2,2-bis(p-hydroxyphenyl) propane was heated to 50° C. and admixed with 28.5 parts by weight (a stoichiometric amount) of bis(p-aminophenyl) methane which had been heated to 80° C.

Control B—100 parts by weight of diglycidylether of 2,2-bis(p-phydroxylhenyl)propane was admixed, at room temperature, with 18 parts by weight (a stoichiometric amount) of Eutectic Control 1.

Composition 1—100 parts by weight of diglycidylether of 2,2-bis(p-hydroxyphenyl)propane was admixed at room temperature, with 23.2 parts by weight (a stoichiometric amount) of Eutectic Mixture I.

Castings were formed from these compositions utilizing a cure cycle of 2 hours at 80° C. and 4 hours at 160° C.

|  | Control A | Control B | Composition I |
|---|---|---|---|
| Tensile strength, p.s.i.[1] | 10,300 | 10,100 | 12,800 |
| Tensile elongation, percent [1] | 2.5 | 2.5 | 3.8 |

[1] ASTM 638-64T.

Samples of Eutectic Control I and Eutectic Mixture 1 were also tested for stability on standing at room temperature about 23° C.

Eutectic Control I crystallized after 90 days.

Eutectic Mixture 1 was still stable, no crystallization, after 2 years.

Also, in order to demonstrate the excellent storage life of the compositions of this invention, the gel time of a 50 gram sample of Control A and of Composition I were determined immediately after formulation of the compositions.

Control A gelled in less than 30 minutes.

Composition I had not undergone any discernable change after 24 hours.

The storage life of Control Band of Composition I were also compared, at elevated temperature, by heating 50 gram samples of each to 80° C. At 80° C., Control B gelled in 30 minutes while Composition I had not gelled after 60 minutes.

It is to be understood that the disclosures of all references noted are incorporated herein by reference.

What is claimed is:

1. A curable composition comprising a polyepoxide having an oxirane epoxy equivalency of greater than one and a liquid eutectic mixture, in an amount sufficient to cure the composition to an infusible product, consisting essentially of (a) about 35 to about 45 parts by weight of o-tolylenediamine and m-tolylenediamine wherein the o-tolylenediamine is present in an amount of about 60 to about 70 percent by weight and the m-tolylenediamine is present in an amount of about 30 to about 40 percent by weight, based on the combined weight of the o- and m-tolylenediamine and (b) about 55 to about 65 parts by weight of bis(aminophenyl)-methane.

2. A curable composition as defined in claim 1 wherein the liquid eutectic is a mixture of (a) 40 parts by weight of a mixture of o-tolylenediamine and m-tolylenediamine wherein the o-tolylenediamine is present in an amount of 60 percent by weight and the m-tolylenediamine is present in an amount of 40 percent by weight, based on the combined weight of the o- and m-tolylenediamine and (b) 60 parts by weight of bis(p-aminophenyl)-methane.

3. A curable composition as defined in claim 1 wherein the liquid eutectic is present in an amount of about 70 percent of stoichiometric to about 20 percent in excess of stoichiometric.

4. A curable composition as defined in claim 1 wherein the said polyepoxide is a polyglycidyl ether of a polyhydric phenol.

5. A curable composition as defined in claim 1 wherein the said polyepoxide is diglycidyl ether of 2,2-bis(p-hydroxyphenyl)propane and the liquid eutectic consists essentially of 40 parts by weight of a mixture of 2,3-diaminotoluene and 2,4-diaminotoluene wherein the 2,3-diaminotoluene is present in an amount of 60 percent by weight and the 2,4-diaminotoluene is present in an amount of 40 percent by weight, based on the combined weight of the 2,3- and 2,4-diaminotoluenes and (b) 60 parts by weight of bis(p-aminophenyl)methane.

6. A curable composition as defined in claim 1 wherein said liquid eutectic is present in about a stoichiometric amount.

7. A curable composition as defined in a claim 1 wherein the said polyepoxide is the polyglycidyl ether of 2,2-bis(p-hydroxyphenyl) propane.

8. The cured product of the composition of claim 1.

References Cited

UNITED STATES PATENTS 2,801,229 7/1957 DeHoff et al. _____ 260—47EP
2,853,467 9/1958 Bloom et al. _____ 260—47EP HAROLD D. ANDERSON, Primary Examiner T. E. PERTILLA, Assistant Examiner U.S. Cl. X.R.

260—2, 37, 59